United States Patent [19]
Ueno

[11] Patent Number: 5,734,509
[45] Date of Patent: Mar. 31, 1998

[54] ZOOM LENS SYSTEM

[75] Inventor: Yasunori Ueno, Tokyo, Japan

[73] Assignee: Nikon Corporation, Tokyo, Japan

[21] Appl. No.: 713,592

[22] Filed: Sep. 13, 1996

Related U.S. Application Data

[63] Continuation of Ser. No. 163,889, Dec. 8, 1993.

[30] Foreign Application Priority Data

Dec. 9, 1992 [JP] Japan ................... 4-351521

[51] Int. Cl.$^6$ .................. G02B 15/14; G02B 25/00; G02B 23/00; G02B 13/10
[52] U.S. Cl. .................. 359/689; 359/645; 359/716; 359/399; 359/422; 354/222
[58] Field of Search .................. 359/689, 645, 359/716, 791, 399, 422; 354/222, 223

[56] References Cited

FOREIGN PATENT DOCUMENTS

| | | |
|---|---|---|
| 53-51757 | 5/1978 | Japan . |
| 62-134617 | 6/1987 | Japan . |
| 0214805 | 8/1990 | Japan ................... 359/689 |
| 92011565 | 7/1992 | WIPO ................... 354/222 |

*Primary Examiner*—David C. Nelms
*Assistant Examiner*—Evelyn A. Lester
*Attorney, Agent, or Firm*—Michael N. Meller

[57] ABSTRACT

A zoom lens system is composed of three lens groups. Arranged in the order from an eyepoint side are a first lens group $G_1$ having a positive refracting power, a second lens group $G_2$ having a positive refracting power and movable along an optical axis during the period of zooming, and a third lens group $G_3$ having a negative refracting power and movable along the optical axis during the period of zooming. In the second lens group $G_2$, at least one positive lens includes a lens surface composed of an aspheric surface at least on one of its eyepoint side and object side. Not only a sufficient eye relief is ensured but also various aberrations are corrected throughout the whole zooming range.

14 Claims, 3 Drawing Sheets

ZOOM LENS SYSTEM

This application is a continuation of application Ser. No. 08/163,889, filed Dec. 8, 1993.

BACKGROUND OF THE INVENTION

1. Field of the Invention

The present invention relates to a zoom lens system in an ocular lens system adapted for use in telescopes, binoculars, etc.

2. Description of the Prior Art

With the conventional ocular lens systems of the type heretofore known, the distance (eye relief) from the last lens surface of the ocular lens to the eye point position must be maintained to be sufficient and therefore there is a restriction to the lower limit of the aperture of the ocular lens. Also, in order that a zoom lens system may be formed within an ocular lens system, it is necessary to provide spaces for the movement of the lenses for zooming purposes with the result that the whole length of the ocular lens system is increased and hence it is difficult to construct the lens in a compact manner.

While the construction of the ocular lens system in a compact manner requires that the aperture of the ocular lens is decreased to increase the refracting powers of the respective lens groups, in this case the occurrence of relatively large aberrations present a problem. As a result, the correction of such aberrations inevitably requires to increase the number of lenses and it is extremely difficult to simultaneously solve the problem of the compact construction and the problem of the necessity to effect a satisfactory aberration correction while maintaining a sufficiently long eye relief.

For instance, Japanese Laid-Open Patent Application No. 51757/1978 discloses an ocular zoom lens system composed of a lens system of a four-groups six-lenses construction. However, this known zoom lens system is complicated in construction and its use in practical applications still leaves a number of difficulties to be solved.

On the other hand, Japanese Laid-Open Patent Application No. 134617/1987 discloses a zoom lens system comprising a relatively simple lens system of a three-groups five-lenses construction. The zoom lens system disclosed in this prior publication not only ensures a sufficiently long eye relief and satisfactorily excellent correction of various aberrations but also attains a compact construction. The construction of the zoom lens system shown in this prior publication is schematically shown in FIG. 2 of the accompanying drawings. It is to be noted that FIG. 2 shows the arrangement of the lenses in the shortest focal length condition (the high magnification condition as a telescope).

These conventional zoom lens systems are such that, while, in either case, the correction of aberrations can be effected relatively satisfactorily in the region of the longest focal length state for the ocular zoom lens system, there still remains about 6 to 9% of distortion aberration in the other focal length regions.

In addition, in the case of an ocular zoom lens system having a zoom ratio which is 2 or over, the conventional technique involves the problem of causing a large distortion aberration of 10% or over and therefore it is heretofore considered to be impossible to manufacture any ocular zoom lens system having such a large zoom ratio.

SUMMARY OF THE INVENTION

It is the primary object of the present invention to overcome the foregoing deficiencies in the prior art. More particularly, it is an object of the present invention to provide an ocular zoom lens system which is capable of ensuring a sufficient eye relief, realizing a compact structure with a relatively simple construction and satisfactorily correcting various aberrations in all of the zoom regions.

In accordance with a basic aspect of the present invention, there is thus provided a zoom lens system including, as arranged in the order from the eyepoint side, a first lens group $G_1$ having a positive refracting power, a second lens group $G_2$ having a positive refracting power and movable along an optical axis during zooming, and a third lens group $G_3$ having a negative refracting power and movable along the optical axis during zooming whereby in response to a zooming operation, the second and third lens groups $G_2$ and $G_3$ are moved in the opposite directions with an object image formed therebetween being held between the two lens groups $G_2$ and $G_3$, and the second lens group $G_2$ includes positive lens means with at least one of its eyepoint-side lens surface and object-side lens surface being composed of an aspheric surface.

In accordance with a preferred aspect of the present invention, assuming that symbols $r_a$ and $r_b$ respectively designate the apex radiuses of curvature of the eyepoint-side lens surface and the object-side lens surface of the positive lens means, the following condition is satisfied $$0<(r_b+r_a)/(r_b-r_a)<0.7 \qquad (1)$$

and also at least one of the eyepoint-side lens surface and the object-side lens surface is composed of an aspheric surface.

In accordance with another preferred aspect of the present invention, assuming that the shape of the aspheric surface is such that symbol X represents the amount of deviation from the apex portion of the lens surface in the optical axis direction, y the amount of deviation from the apex portion of the lens surface in a direction perpendicular to the optical axis, $C_0$ the reciprocal number (1/R) of the apex radius R of curvature, K a constant of the cone, and $C_{2i}$ a coefficient of aspheric surface (here i is an order), then the following equation holds $$X = \frac{C_0 y^2}{1+(1-KC_0^2 y^2)^{1/2}} + \sum_{i=1}^{5} C_{2i} y^{2i} \qquad (2)$$

and it is selected so that when i=2, the said $C_{2i}(=C_4)$ satisfies the following $$1*10^{-6} < |C_4| < 1*10^{-2} \qquad (3)$$

The zoom lens system according to the present invention is an ocular zoom lens which maintains a satisfactory performance throughout the whole zooming regions, maintains the eye relief to be long enough even during the period of zooming, corrects various aberrations including, for example, the distorsion aberration satisfactorily and ensures an easy observation.

In accordance with the present invention, by virtue of the use of an aspheric surface for the shape of the lens surface, despite its simple lens construction of a three-groups five-lenses construction, the ocular zoom lens makes it possible to construct an optical system in which various aberrations including, for example, distortion aberration are corrected satisfactorily. Therefore, a highly-efficient ocular zoom lens system is available which is compact and having a sufficiently long eye relief.

The above and other objects, features and advantages of the present invention will become more apparent from the following description of its embodiments which are shown

3 only for illustrative purposes without any intention of limitation when taken in conjunction with the accompanying drawings.

DESCRIPTION OF THE PREFERRED EMBODIMENTS

Figure 1A:
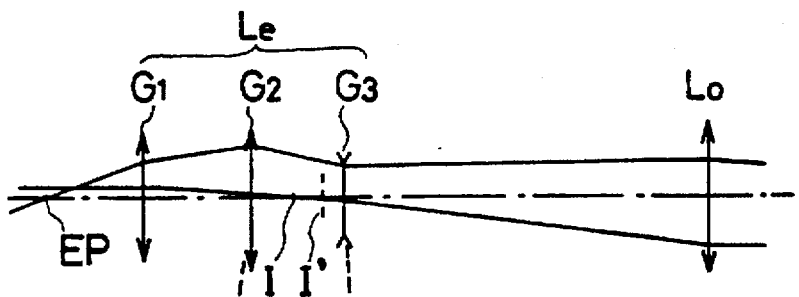
FIGS. 1A, 1B and 1C show schematically the construction and operations of an embodiment of a zoom lens system according to a basic lens construction of the present invention.
Figure 1B:
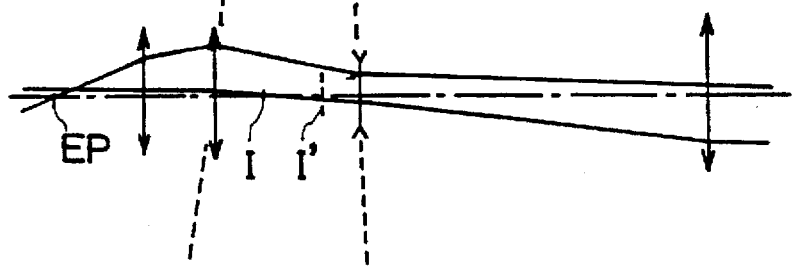
Figure 1C:
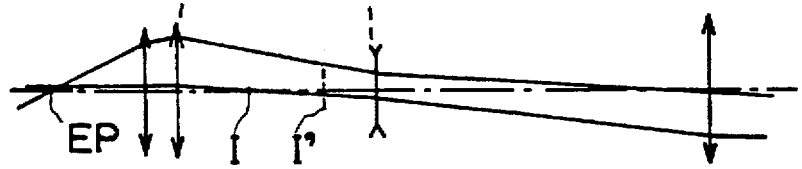
Figure 2:
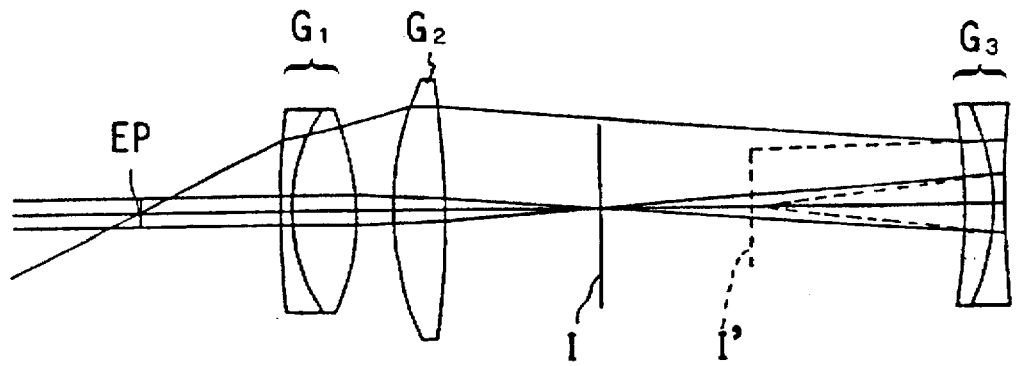
FIG. 2 shows schematically the construction of a prior art ocular zoom lens system.

The basic lens construction of a zoom lens system according to the present invention utilizes as its starting point the construction disclosed in the previously mentioned Japanese Laid-Open Patent Application No. 134617/1987. FIGS. 1A, 1B and 1C show schematically the construction and operations of an embodiment of a zoom lens system according to the basic lens construction.

In these Figures, an ocular zoom lens system $L_e$ according to the present embodiment includes, in the order from the side of an eyepoint EP, a first lens group $G_1$ having a positive refracting power, a second lens group $G_2$ having a positive refracting power and movable along the optical axis during zooming, and a third lens group $G_3$ having a negative refracting power and movable along the optical axis during zooming.

The second lens group $G_2$ is composed of a single positive lens component whose surface of a greater curvature is directed toward the eyepoint side, and during the period of zooming operation the second lens group $G_2$ and the third lens group $G_3$ are movable in the opposite directions while interposing therebetween an object image I which is formed by an objective lens $L_0$.

FIG. 1A shows the longest focal length condition as the ocular lens (the low magnification condition as the telescope), FIG. 1B the intermediary condition, and FIG. 1C the shortest focal length condition as the ocular lens (the high magnification condition as the telescope).

As will be seen from these Figures, when the focal length of the ocular lens is decreased, the second lens group $G_2$ and the third lens group $G_3$ are moved so as to increase the spacing therebetween. Then, with this construction, it is important that the single positive lens forming the second lens group $G_2$ is shaped in such a manner that the apex radius of curvature $r_a$ of its eyepoint-side lens surface and the apex radius of curvature $r_b$ of its object-side lens surface are determined so as to satisfy the relation of the previously mentioned conditional expression (1).

Also, it is important that at least one of the eyepoint-side lens surface and the object-side lens surface of the said positive lens is an aspheric surface for distortion aberration removing purposes.

In order to satisfy the conditional expression (1), it is only necessary to form the eyepoint-side lens surface of the positive lens so as to have a relatively small radius of curvature as compared with the object-side lens surface and this has the effect of simultaneously attaining the construction of the second lens group $G_2$ with a single positive lens and the satisfactory correction for variations of the aberrations such as distortion aberration and astigmatism due to zooming. If the shape of the said positive lens exceeds the upper limit of the conditional expression (1), the astigmatism and the distortion aberration are increased, whereas when the lower limit is not met, not only the astigmatism and the distortion aberration are increased but also the coma is increased.

It is to be noted that while it is conceivable to use a laminated lens for the single positive lens forming the second lens group $G_2$ for the purpose of more satisfactorily correcting the chromatic aberration, it is needless to say that even this case comes within the technical scope of the present invention. In the ordinary applications other than special uses, however, a fully satisfiable performance can be obtained by using a single positive equiconcave lens satisfying the conditional expression (1) in place of the laminated lens for the single positive lens forming the second lens group $G_2$.

While the above-constructed zoom lens system according to the present embodiment is capable of satisfactorily correcting the aberration variations due to zooming, such as, distortion aberration and astigmatism for the ordinary application purposes, where the zoom ratio is 2 or over, with the conditional expression (1) alone the variation of the distortion aberration is increased and the correction of the aberration becomes difficult. In such a case, at least one of the eyepoint-side lens surface and the object-side lens surface of the single positive lens must be composed of an aspheric surface so as to eliminate the distortion aberration.

Where such aspheric surface is to be formed, the conditions which must be met by the respective lens groups become as shown by the following conditional expressions (4) to (8). It is to be noted that in the following conditional expressions $f_M$ represents the composite focal length of the ocular zoom lens system in the shortest focal length condition, $f_1$ the focal length of the first lens group $G_1$, $f_2$ the focal length of the second lens group $G_2$, $f_3$ the focal length of the third lens group $G_3$, $S_1$ the principal point spacing of the first lens group $G_1$ and the second lens group $G_2$, and $S_2$ the principal point spacing of the second lens group $G_2$ and the third lens group $G_3$.

$$2.5 < f_1/f_M < 5.0 \qquad (4)$$

$$2.0 < f_2/f_M < 4.0 \qquad (5)$$

$$2.5 < |f_3|/f_M < 7.0 \qquad (6)$$

$$0.1 < S_1/f_M < 1.0 \qquad (7)$$

$$3.0 < S_2/f_M < 5.0 \qquad (8)$$

It is to be noted that the following show the respective corresponding conditions for the prior art disclosed in the previously mentioned Japanese Laid-Open Patent Application No. 134617/1987.

$$2.8 < f_1/f_M < 4.5 \tag{4a}$$

$$2.3 < f_2/f_M < 4.0 \tag{5a}$$

$$3.7 < |f_3|/f_M < 7.0 \tag{6a}$$

$$0.1 < S_1/f_M < 1.0 \tag{7a}$$

$$3.5 < S_2/f_M < 5.0 \tag{8a}$$

Since the focal lengths of the respective lens groups are normarized by the composite shortest focal length $f_M$ as the ocular lens system, these conditional expressions (4) to (8) determine the proper power distributions for the lens groups. As will be seen from a comparison of these conditional expressions, due to the condition of the aspheric surface, the conditions to be met by the lens groups are eased so that not only the satisfactory correction of aberrations can be effected easily but also the restrictions on the designing conditions can be eased.

Then, where the focal length $f_1$ of the first lens group $G_1$ exceeds the upper limit of the conditional expression (4), the refracting power of the first lens group $G_1$ is decreased and the zooming effect of the second lens group $G_2$ is decreased, thereby excessively increasing the burden of the zooming on the third lens group $G_3$. As a result, the third lens group $G_3$ crosses an object image formed between the second lens group $G_2$ and the third lens group $G_3$ during the period of zooming. As a result, the flaws and dirt on the lens surfaces tend to appear in the field of view, and also the burden of the aberration correction on the third lens group $G_3$ is increased excessively, thereby making it difficult to balance the aberration correction. On the other hand, where the focal length $f_1$ of the first lens group $G_1$ is less than the lower limit of the conditional expression (4), the refracting power of the first lens group $G_1$ becomes excessively large so that the correction of aberrations, particularly the correction of the coma and chromatic aberration becomes difficult and it is impossible to realize a simple lens construction.

On the other hand, where the focal length of the second lens group $G_2$ exceeds the upper limit of the conditional expression (5), the refracting power of the second lens group $G_2$ is decreased and the amount of movement of the second lens group $G_2$ for zooming purposes is increased, thereby causing the second lens group $G_2$ to cross an object image between the second lens group $G_2$ and the third lens group $G_3$ during the period of zooming. Thus, this is not preferable since the flaws and dirt on the lens surfaces apper prominently within the visual field for observation. On the contrary, where the focal length of the second lens group $G_2$ is less than the lower limit of the conditional expression (5), the refracting power of the second lens group $G_2$ is increased so that various aberrations such as distortion aberration and astigmatism are caused to increase and it becomes difficult to simplify the lens construction.

Also, where the focal length of the third lens group $G_3$ is greater than the upper limit of the conditional expression (6), the negative refracting power of the third lens group $G_3$ is decreased so that it is necessary to relatively increase the refracting power of the second lens group $G_2$ to maintain the focal length of the whole system at a given value and this has the effect of increasing the distortion aberration and the astigmatism. On the contrary, where the focal length of the third lens group $G_3$ is less than the lower limit of the conditional expression (6), the cama, particularly the coma in the long focal length conditions as the ocular lens is increased and the aberration correction is made difficult.

On the other hand, the conditional expression (7) determines the principal point spacing $S_1$ of the first lens group $G_1$ and the second lens group $G_2$. Where this principal point spacing $S_1$ is greater than the upper limit of the conditional expression (7), the spacing between the first lens group $G_1$ and the second lens group $G_2$ is increased and the aperture of the second lens group $G_2$ is increased excessively, thereby making the aberration correction difficult. On the contrary, if the principal point spacing $S_1$ is less than the lower limit of the conditional expression (7), the spacing between the first lens group $G_1$ and the second lens group $G_2$ is decreased so that the refracting power of the second lens group $G_2$ must be decreased from the power distribution point of view and the conditional expression (5) is no longer met. Thus, this is not desirable on the same ground as mentioned previously.

The conditional expression (8) determines the principal point spacing $S_2$ of the second lens group $G_2$ and the third lens group $G_3$. Where this principal point spacing $S_2$ is greater than the upper limit of the conditional expression (8), the whole length of the ocular lens system is increased thus making it is impossible to make the construction smaller and more compact. Moreover, the negative refracting power of the third lens group $G_3$ must be decreased so as to ensure the predetermined focal length for the ocular lens so that the amount of movement of the third lens group $G_3$ is increased tending to cross the object image and this is likewise undesirable. On the contrary, if the principal point spacing $S_2$ is less than the lower limit of the conditional expression (8), the moving spaces for zooming between the respective lens groups is decreased thus making it difficult to ensure a sufficient zooming range within the limited size of the zoom lens system.

With the construction described above, as will be described later, the first lens group $G_1$ having a positive refracting power and adapted to remain stationary during zooming should preferably be constructed as a positive laminated lens composed of a negative meniscus lens having its convex surface directed toward the eyepoint side and a positive equiconvex lens. In addition, the third lens group $G_3$ should preferably be made by laminating a positive meniscus lens and a negative equiconcave lens so as to form an equiconcave lens as a whole, and in this case the equivalent performance can be ensured irrespective of which of the negative lens and the positive meniscus lens is arranged on the eyepoint side.

With the ocular zoom lens system according to the present embodiment, assuming that $V_1$ represents the Abbe's number of the negative lens in the first lens group $G_1$ and $V_3$ the Abbe's number of the negative lens in the third lens group $G_3$, then the conditions of the following expressions (9) and (10) should preferably be satisfied.

$$V_1 < 40 \tag{9}$$

$$V_3 > 40 \tag{10}$$

The conditional expression (9) shows the condition which is effective for satisfactorily correcting chromatic aberration without reducing the radius of curvature of the bonded surface of the positive laminated lens forming the first lens group $G_1$ and this has the effect of making the construction of the second lens group $G_2$ and the third lens group $G_3$ more compact.

The conditional expression (10) is effective in reducing the variation of chromatic aberration due to zooming so that if the Abbe's number $V_3$ of the negative lens in the third lens group $G_3$ fails to satisfy the conditional expression (10), the burden of the chromatic aberration correction on the first lens group $G_1$ and the second lens group $G_2$ is increased and thus the construction of the lens system is complicated. In this case, while the chromatic aberration can be corrected by reducing the negative refracting power of the third lens group $G_3$, to do so makes it impossible to satisfy the conditional expression (6) and therefore it is not desirable.

The preferred aspheric shape of the lens surface is given by the previously mentioned conditional expression (2) on the assumption that X represents the amount of deviation from the lens apex in the optical axis direction, y the amount of deviation from the lens apex in a direction perpendicular to the optical axis, $C_0$ the reciprocal number ($=1/R$) to the apex radius R of curvature, K a constant of the cone, and $C_{2i}$ a coefficient of the aspheric surface (i is an order).

On the other hand, where the aspheric shape of the lens surface is determined in accordance with the conditional expression (2), in the conditional expression (2) the coefficient of the aspheric surface $C_{2i}$ is limited by the conditional expression (3) with respect to the order of i=2.

The meanings of the conditional expressions (2) and (3) will now be explaned.

To begin with, for purposes of simplification, a situation is assumed in which an ocular lens of a single focal point is combined with a compensating plate as a lens having no refracting power and the compensating plate is formed to have an aspheric surface, thereby correcting the distortion aberration (the aberration of the pupil).

Figure 3:
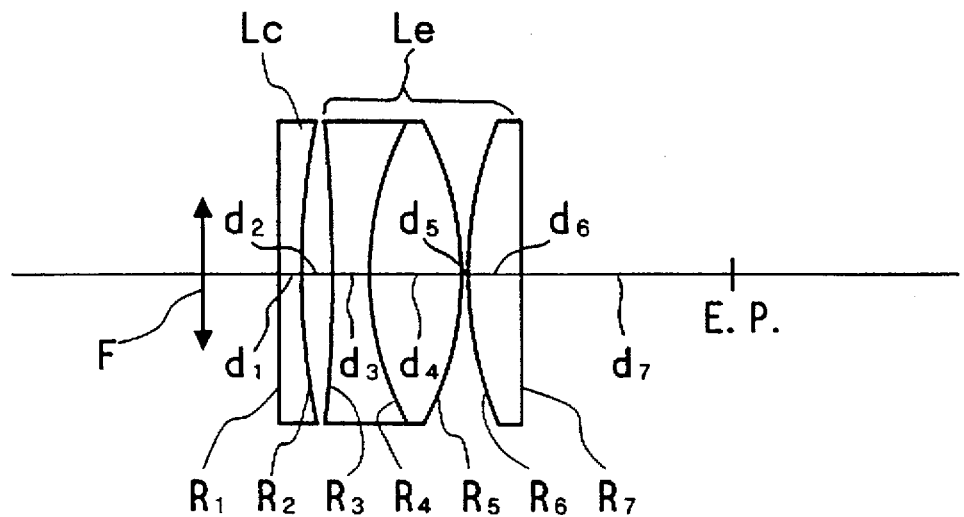
FIG. 3 shows schematically the condition in which a compensating plate $L_c$ having an aspheric shape is arranged in the conventional ocular lens system $L_e$ composed of spheric lenses for the purpose of explaining the aberration correction by the aspherically shaped lens surface.

Let us consider by way of example the construction shown in FIG. 3, that is, consider a construction in which a compensating plate $L_c$ having an aspheric surface in arranged between the front-side focal plane F of an ocular lens $L_e$ composed of a conventional spheric lenses and the ocular lens $L_e$. In this case, the compensating plate $L_c$ corrects the pupil aberration or the distortion aberration of the ocular lens $L_e$ and in this way the essential aberration correction of the ocular lens is achieved.

Figure 4:
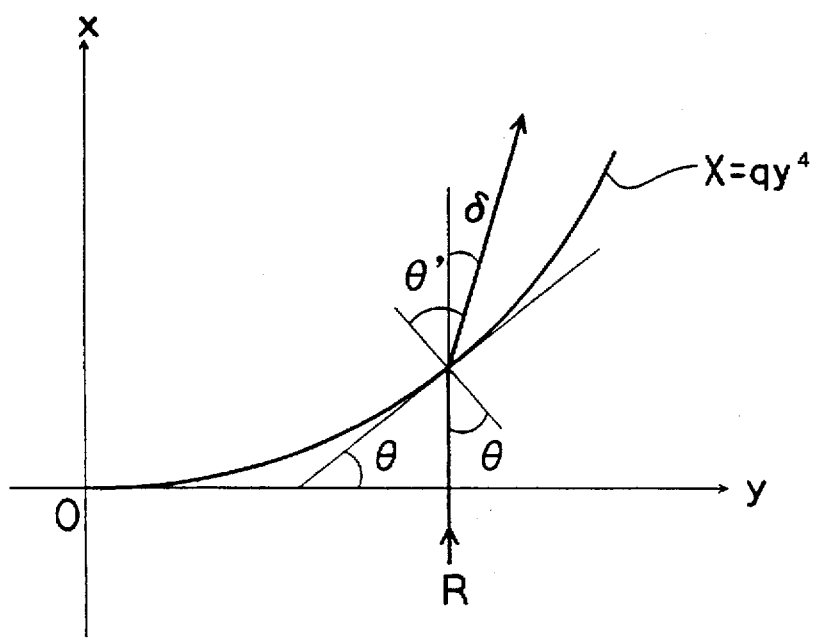
FIG. 4 is a functional graph representing the shape of the compensating plate $L_c$ shown in FIG. 3.
Figure 5:
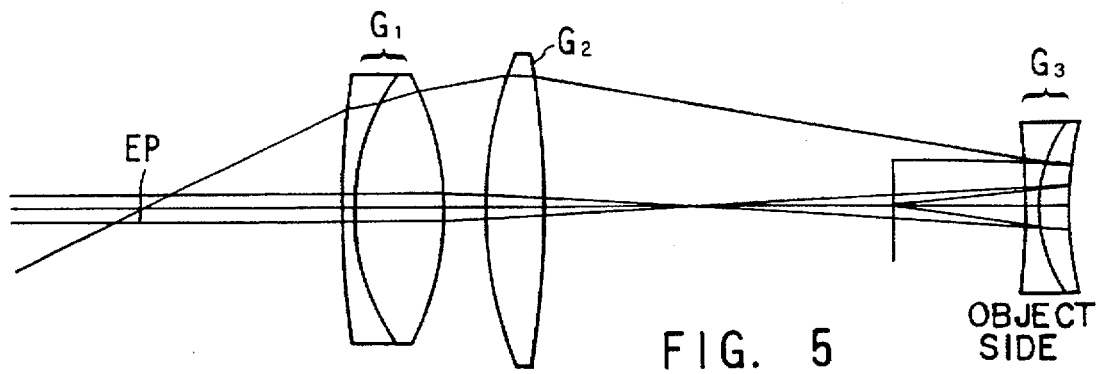
FIG. 5 shows schematically the construction of a specific ocular zoom lens system according to a first embodiment of the present invention.
Figure 6:
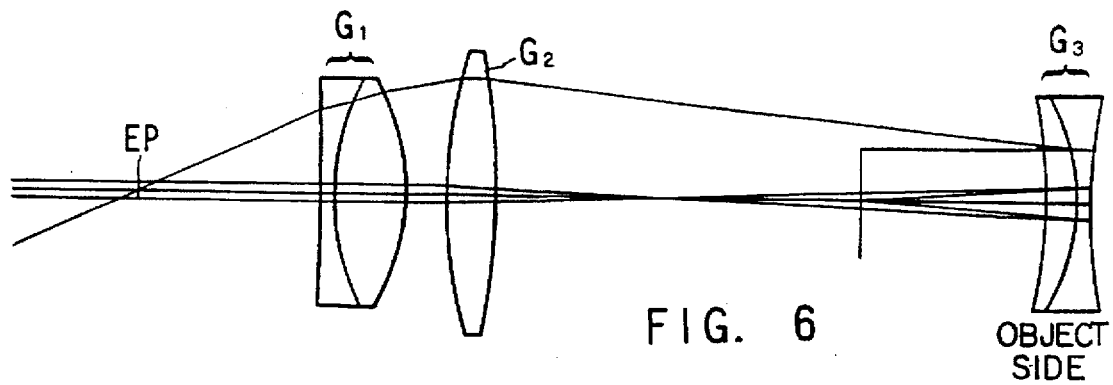
FIG. 6 shows schematically the construction of a specific ocular zoom lens system according to a second embodiment of the present invention.
Figure 7:
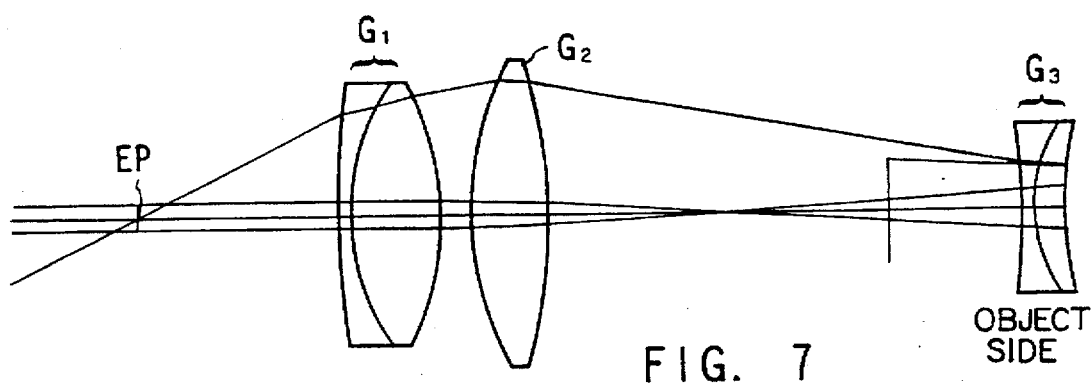
FIG. 7 shows schematically the construction of a specific ocular zoom lens system according to a third embodiment of the present invention.
Figure 8:
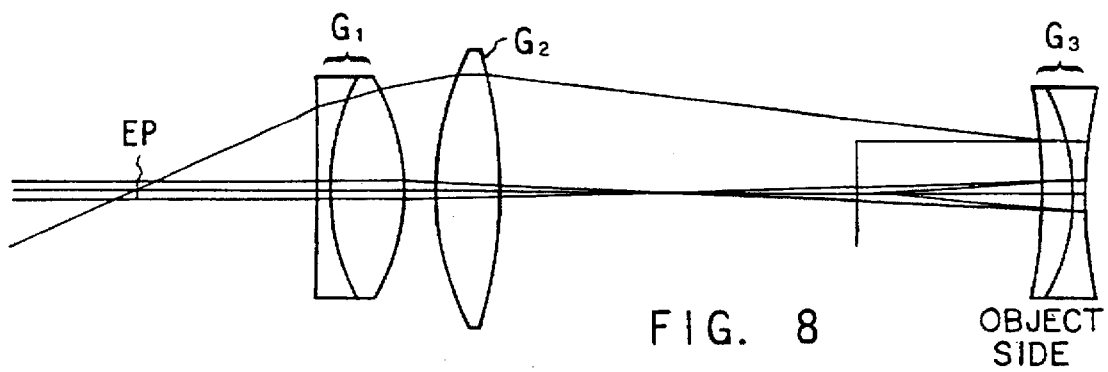
FIG. 8 shows schematically the construction of a specific ocular zoom lens system according to a fourth embodiment of the present invention.

Assum now that the shape of the compensating plate $L_c$ is such as shown in FIG. 4 so that it is given by the following equation (11) with q representing a constant.

$$X=qy^4 \qquad (11)$$

Here, the angle $\theta$ of the tangent is obtainable by differentiating equation (11) so that if it is considered in the region of the third-order aberration, it can be given by the following equation (12).

$$\theta=4qy^3 \qquad (12)$$

Assuming that symbol n represents the refractive index of the compensating plate $L_c$, $\theta'$ the angle of the light beam R after the passage through the aspheric surface, and $\delta$ the angle of deviation of the light beam due to the aspheric surface, then $\delta$ is given by the following equation (13).

$$\delta=\theta'-\theta=(n-1)\theta=4(n-1)qy^3 \qquad (13)$$

On the other hand, by giving a constant A, an aberration $\Delta Sa$ of the pupil due to the ocular lens can be given in the region of the third-order aberration by the following equation (14).

$$\Delta Sa=Ay^2 \qquad (14)$$

Here, designated by y is the angle of incidence of the light incident on the ocular lens.

Assuming now that symbol $\beta$ designates the magnification at the imaging of the pupil of the ocular lens $L_e$, the aberration $\Delta Sa$ of the pupil is given by the following equation (15).

$$\Delta Sa=\beta^2 \cdot \Delta S \qquad (15)$$

Also, assuming that the distance S to the entrance pupil is sufficiently large as compared with the focal length of the ocular lens $L_e$, the distance S is related to $\Delta S$ and $\delta$ by the following equation (16).

$$\Delta S=S^2 \cdot \delta/y=4(n-1)q \cdot S^2 \cdot y^2 \qquad (16)$$

Substituting equation (16) into equation (15), we obtain the following equation (17).

$$\Delta Sa=4(n-1) \cdot \beta^2 \cdot q \cdot S^2 \cdot y^2 \qquad (17)$$

When a comparison is made between equations (17) and (14), the relation of the following equation (18) holds.

$$A=4(n-1)\beta^2 \cdot q \cdot S^2 \qquad (18)$$

From the foregoing it will be seen that equations (17) and (14) coincide with each other. Therefore, by determining the constant q of equation (11) so as to cancel the aberration of the pupil given by equation (14), it is possible to obtain an ocular lens $L_e$ which is free of distortion aberration on the whole.

Rewriting equation (11) for this purpose, equation (19) becomes as follows.

$$X=q \cdot y^4=y^4 \cdot A/\{4(n-1) \cdot \beta^2 \cdot S^2\} \qquad (19)$$

Also, if the eye relief of the ocular lens $L_e$ is represented as Sa, then there results $\beta=Sa/S$ and thus equation (19) is rewritten as follows $$X=y^4 \cdot A/\{4(n-1) \cdot Sa^2\} \qquad (20)$$

When i=2 in the previously mentioned general expression (2) representing the aspheric surface, the above-mentioned constant q corresponds to the coefficient $C_{2i}(=C_4)$ in the term of $y^{2i}(=y^4)$.

It can be considered that in equation (20) the eye relief Sa of the ocular lens $L_e$ is on the order of 10 to 30. Also, as regards the constant A, while differing depending on the lens construction, entrance pupil position, focal length, etc., of the ocular lens $L_e$, the coefficient $C_4$ in expression (3) can be determined so as to satisfy the following conditional expression (3a) and thereby to achieve a fully satisfactory correction of the pupil aberration (i.e., the distortion aberration) with respect to the constant A of the ocular lens $L_e$ for general-purpose uses. In this case, the aspheric surface is shaped such that a radius of curvature at a peripheral portion of the lens surface is larger than a radius of curvature at an apex portion of the lens surface.

$$1*10^{\char`\^}(-6)<|C_4|<1*10^{\char`\^}(-2) \qquad (3a)$$

However, if the value of $|C_4|$ is less than the lower limit of this conditional expression, the pupil aberration (distortion aberration) is corrected insufficiently, whereas if $|C_4|$ exceeds the upper limit of this conditional expression, an excessive correction results.

Next, consider the case where the apex radius of curvature $C_0$ is not 0, that is, where the coefficient in the term of $y^2$ is not 0.

Assume now that the aspheric shape is given by the following equation (21)

$$X = p \cdot y^2 + q \cdot y^4 \quad (21)$$

In the like manner as mentioned previously, θ is given by the following equation (22)

$$\theta = 2p \cdot y + 4q \cdot y^3 \quad (22)$$

Therefore, ΔSa is given by the following equation (23)

$$\Delta Sa = 4(n-1) \cdot \beta^2 \cdot q \cdot S^2 \cdot y^2 + 2(n-1)\beta^2 \cdot p \cdot S^2 \quad (23)$$

The first term in the right member of this equation (23) is the same as the case in which the apex curvature $C_0$ is 0. Also, the second term is a constant term which does not include $y^2$, that is, it is a term which represents the shift of an image point due to the surface of the apex curvature $C_0$ and it has no bearing on the correction of pupil aberration. As a result, no problem is caused even if the shape of the compensating plate $L_c$ includes a shape corresponding to the term of $y^2$ (quadratic surface), that is, there is no inconvenience even if the compensating plate $L_c$ is formed as a lens having a refracting power, and in this case only the term of $y^4$ affects the correction of the pupil aberration.

While the description has been made so far only on the term of $y^{2i}$ or the term of $y^4$ in expression (2) in the case of i=2 with respect to the shape of the compensating plate $L_e$, this is due to the fact that the pupil aberration is satisfactorily corrected only by the term of $y^4$ in the region of the third-order aberration.

If the field angle of the ocular lens $L_e$ is increased, however, the pupil aberration gradually deviates from the region of the third-order aberration and situations arise in which the pupil aberration cannot be corrected completely by the previously mentioned aspheric compensating plate $L_c$ represented only by the term of $y^4$. In such a case, it is only necessary to further add a higher-order correction term in addition to the above-mentioned term of $y^4$ for the aspheric shape of the compensating plate $L_c$.

Further, while the foregoing description has been made on the single-focus ocular lens $L_e$, the basic concept is the same for the zoom ocular lens. Where the concept is applied to a zoom lens system as in the case of the present invention, however, it is needless to say that there are frequent cases where a higher-order correction term is required even in the sense of reducing variation of the distortion aberration due to zooming.

In any way, there is no difference in a sense that the term having the greatest effect on the aberration correction is after all the term of $y^4$ and what is important is the fact that its coefficient $|C_4|$ is within the range which satisfies the conditional expression (3).

Some specific embodiments of the present invention will now be described. It is to be noted that in these embodiments the zoom ratio is 2 or 2.25 and the field angle (apparent field of view) is in the range from 50° to 40°. Also, in each of the embodiments the eye relief is maintained at a considerably large value of about 14 mm to 16 mm even during the high magnification condition as a telescope. While each of the embodiments satisfies all of the previously mentioned conditions and its first and second lens groups $G_1$ and $G_2$ are substantially the same in lens construction and shape, an aspheric surface is employed for the object-side lens surface of the second lens group $G_2$ thereby ensuring the correction of distortion aberration.

FIGS. 5 to 8 show the arrangements of lens systems in the shortest focal length conditions (the high magnification conditions as telescopes) of the first to fourth embodiments, and the Figures show the light rays as well as the principal light ray of the maximum field angle from an object at infinity on the optical axis.

While, in each of the embodiments, the third lens group $G_3$ is formed as a negative lens of a laminated type as mentioned previously, the direction of the lamination surface is not particularly limited to the illustrated one. For instance, in the cases of the first and third embodiments shown in FIGS. 5 and 7, respectively, the concave and convex on the lamination surface of the third lens group $G_3$ are respectively directed in the reverse directions to the corresponding ones in the cases of the second and fourth embodiments shown in FIGS. 6 and 8, respectively.

The following Tables 1, 2, 3 and 4 respectively show the various data of the lens systems in the first, second, third and fourth embodiments, respectively. In these Tables, the numbers indicated adjacent to the designations $G_1$, $G_2$ and $G_3$ of the lens groups indicate the order of the positions of the lens surfaces from the eyepoint side. Also, the refractive indices and the Abbe's numbers show the values for the d line (λ=587.6 nm).

TABLE 1

First Example focal length 2f = 8.35 mm ~ 16.7 mm
field angle 2ω = 50 deg. ~ 40 deg.

| lens group | radius of curvature r (mm) | center thickness d (mm) | refractive index n | Abbe's number ν |
|---|---|---|---|---|
| G1 No. 1 | 64.5 | 1.0 | 1.79504 | 28.6 |
| No. 2 | 16.7 | 7.0 | 1.62041 | 60.4 |
| No. 3 | −22.2 | $d_3$ = variable | | |
| G2 No. 4 | 31.1 | 4.6 | 1.71300 | 54.0 |
| No. 5*) | −52.6 | $d_5$ = variable | | |
| G3 No. 6 | −49.2 | 1.0 | 1.71300 | 25.4 |
| No. 7 | 10.8 | 2.4 | 1.80518 | 54.0 |
| No. 8 | 25.7 | Bf = variable | | |

| f | $d_3$ | $d_5$ | Bf | |
|---|---|---|---|---|
| 8.35 | 3.21 | 37.5 | −13.6 | $f_1$ = 34.0 |
| 11.8 | 11.8 | 26.2 | −11.0 | $f_2$ = 28.0 |
| 16.7 | 18.8 | 15.8 | −7.6 | $f_3$ = −26.5 |

$(r_b + r_a)/(r_b − r_a)$ = 0.257
$f_1/f_M$ = 4.07
$f_2/f_M$ = 3.36
$|f_3|/f_M$ = 3.18
$S_1/f_M$ = 0.57
$S_2/f_M$ = 4.87

*)No.5: aspherical

TABLE 2

Second Example focal length 2f = 9.3 mm ~ 21 mm
field angle 2ω = 50 deg. ~ 39 deg.

| lens group | radius of curvature r (mm) | center thickness d (mm) | refractive index n | Abbe's number ν |
|---|---|---|---|---|
| G1 No. 1 | −416.5 | 1.0 | 1.75520 | 27.5 |
| No. 2 | 17.8 | 5.8 | 1.62041 | 60.4 |
| No. 3 | −16.9 | $d_3$ = variable | | |
| G2 No. 4 | 36.2 | 4.0 | 1.71300 | 54.0 |
| No. 5*) | −45.9 | $d_5$ = variable | | |
| G3 No. 6 | −39.7 | 2.5 | 1.75520 | 27.6 |
| No. 7 | 15.8 | 1.0 | 1.62041 | 60.4 |
| No. 8 | 40.0 | Bf = variable | | |

| f | $d_3$ | $d_5$ | Bf | |
|---|---|---|---|---|
| 9.3 | 3.0 | 42.7 | −17.9 | $f_1$ = 35.0 |

TABLE 2-continued

Second Example

| 14.0 | 13.8 | 26.9 | −12.9 | $f_2 = 29.0$ |
|------|------|------|-------|--------------|
| 21.0 | 21.2 | 12.1 | −5.5  | $f_3 = -38.0$ |

$(r_b + r_a)/(r_b - r_a) = 0.118$
$f_1/f_M = 3.75$
$f_2/f_M = 3.11$
$|f_3|/f_M = 4.07$
$S_1/f_M = 0.30$
$S_2/f_M = 4.82$

*)No.5: aspherical

TABLE 3

Third Example focal length 2f = 8.35 mm ~ 16.7 mm
field angle 2v = 50 deg. ~ 40 deg.

| lens group | | radius of curvature r (mm) | center thickness d (mm) | refractive index n | Abbe's number ω |
|---|---|---|---|---|---|
| G1 | No. 1 | 65.6 | 1.0 | 1.79504 | 28.6 |
|    | No. 2 | 17.0 | 7.0 | 1.62041 | 60.4 |
|    | No. 3 | −22.2 | $d_3$ = variable | | |
| G2 | No. 4 | 24.1 | 6.0 | 1.49108 | 57.6 |
|    | No. 5*) | −29.4 | $d_5$ = variable | | |
| G3 | No. 6 | −49.2 | 1.0 | 1.71300 | 25.4 |
|    | No. 7 | 10.8 | 2.4 | 1.80518 | 54.0 |
|    | No. 8 | 25.7 | Bf = variable | | |

| f | $d_3$ | $d_5$ | Bf | |
|---|---|---|---|---|
| 8.35 | 2.4 | 36.9 | −13.6 | $f_1 = 34.0$ |
| 11.8 | 11.0 | 25.6 | −11.0 | $f_2 = 28.0$ |
| 16.7 | 18.0 | 15.2 | −7.6 | $f_3 = -26.5$ |

$(r_b + r_a)/(r_b - r_a) = 0.099$
$f_1/f_M = 4.07$
$f_2/f_M = 3.36$
$|f_3|/f_M = 3.18$
$S_1/f_M = 0.57$
$S_2/f_M = 4.87$

*)No.5: aspherical

TABLE 4

Fourth Example focal length 2f = 9.3 mm ~ 21 mm
field angle 2v = 50 deg. ~ 39 deg.

| lens group | | radius of curvature r (mm) | center thickness d (mm) | refractive index n | Abbe's number ω |
|---|---|---|---|---|---|
| G1 | No. 1 | −416.5 | 1.0 | 1.75520 | 27.6 |
|    | No. 2 | 17.8 | 5.8 | 1.62041 | 60.4 |
|    | No. 3 | −16.9 | $d_3$ = variable | | |
| G2 | No. 4 | 24.7 | 5.0 | 1.49108 | 57.6 |
|    | No. 5*) | −31.4 | $d_5$ = variable | | |
| G3 | No. 6 | −39.7 | 2.5 | 1.75520 | 27.6 |
|    | No. 7 | 15.8 | 1.0 | 1.62041 | 60.4 |
|    | No. 8 | 40.0 | Bf = variable | | |

| f | $d_3$ | $d_5$ | Bf | |
|---|---|---|---|---|
| 9.3  | 2.5  | 42.1 | −17.9 | $f_1 = 35.0$ |
| 14.0 | 13.3 | 26.3 | −12.9 | $f_2 = 29.0$ |
| 21.0 | 20.7 | 11.5 | −5.5  | $f_3 = -38.0$ |

TABLE 4-continued

Fourth Example $(r_b + r_a)/(r_b - r_a) = 0.119$
$f_1/f_M = 3.75$
$f_2/f_M = 3.11$
$|f_3|/f_M = 4.07$
$S_1/f_M = 0.30$
$S_2/f_M = 4.82$

*)No.5: aspherical

In these embodiments, the shapes of the aspheric surfaces (No. 5 lens surfaces) are designed according to the previously mentioned expression (2) and the design values of the constants and the parameters used in this case are shown in the following table 5.

TABLE 5

Design Values of the Aspherical

| | Example 1 | Example 2 | Example 3 | Example 4 |
|---|---|---|---|---|
| R | −52.6 | −45.9 | −29.4 | −31.4 |
| K | −17.3 | −9.2 | −9.7 | −8.3 |
| $C_2$ | 0.0 | 0.0 | 0.0 | 0.0 |
| $C_4$ | $0.7*10^{-5}$ | $0.2*10^{-5}$ | $0.1*10^{-4}$ | $0.3*10^{-5}$ |
| $C_6$ | $-0.3*10^{-7}$ | 0.0 | $-0.4*10^{-7}$ | 0.0 |
| $C_8$ | 0.0 | 0.0 | 0.0 | 0.0 |
| $C_{10}$ | $0.8*10^{-13}$ | 0.0 | $-0.5*10^{-12}$ | 0.0 |

It has been confirmed that each of these embodiments provides an ocular zoom lens which is capable of maintaining an excellent performance throughout the whole zooming regions, maintaining the eyepoint to be long enough despite the zooming, ensuring the satisfactory correction of distortion aberration and ensuring easy observation.

It is to be noted that the field angle for the ocular lens $L_e$ can be increased up to about 60° if an increase in the effective diameter of the ocular lens $L_e$ can be disregarded. Further, while, in each of the embodiments, an aspheric surface shape is used for the object-side lens surface of the second lens group $G_2$ so as to correct the distortion aberration, the same effect can be obtained by using an aspheric surface for the eyepoint-side lens surface of the second lens group $G_2$ so as to correct the distortion aberration.

Further, while, in each of the embodiments, the present invention has been shown as applied to an ocular zoom lens system, it is needless to say that the present invention can also be applied to a single-focus ocular lens system.

What is claimed is:

1. A zoom lens system having an eyepoint side and an object side comprising:

a first lens group $G_1$ having a positive refracting power;

a second lens group $G_2$ having a positive refracting power and being movable along an optical axis;

a third lens group $G_3$ having a negative refracting power and being movable along said optical axis; and an objective lens $L_O$ having a positive refracting power;

said first to third lens groups $G_1$ to $G_3$ and said objective lens $L_O$ being arranged in said order from said eyepoint side to said object side, said second lens group $G_2$ and said third lens group $G_3$ being responsive to a zooming operation to move in opposite directions to each other while interposing therebetween an object image formed by said objective lens $L_O$ between said second and third lens groups $G_2$ and $G_3$, said second lens group $G_2$ including a positive lens configuration, and said positive lens configuration having a lens surface made of an aspheric surface.

2. A zoom lens system according to claim 1, wherein said aspheric surface of said positive lens configuration has a shape in which a radius of curvature at a peripheral portion of said lens surface is larger than a radius of curvature at an apex portion of said lens surface.

3. A zoom lens system according to claim 1, wherein the eyepoint-side lens surface of said positive lens configuration is made of said aspheric surface.

4. A zoom lens system according to claim 1, wherein the object-side lens surface of said positive lens configuration is made of said aspheric surface.

5. A zoom lens system according to claim 1, wherein the shape of said aspheric surface is given by the following expression $$X = \frac{C_0 y^2}{1 + (1 - KC_0^2 y^2)^{1/2}} + \sum_{i=1}^{5} C_{2i} y^{2i}$$

where X represents an amount of deviation from an apex portion of said lens surface in an optical axis direction; y represents an amount of deviation from the apex portion of said lens surface in a direction perpendicular to said optical axis; $C_0$ represents a reciprocal (1/R) of a radius R of curvature at the apex portion of said lens surface; K represents a constant of the cone; and $C_{2i}$ (i is an order) represents an aspherical coefficient, and said $C_{2i}$ (=$C_4$) is selected to satisfy the following relation when i=2

$$1*10^{-6} < |C_4| < 1*10^{-2}.$$

6. A zoom lens system according to claim 1, wherein the following conditions are satisfied $$2.5 < f_1/f_M < 5.0,$$

$$2.0 < f_2/f_M < 4.0,$$

$$2.5 < |f_3|/f_M < 7.0,$$

$$0.1 < S_1/f_M < 1.0, \text{ and}$$

$$3.0 < S_2/f_M < 5.0$$

where $f_M$ represents a composite focal length of said zoom lens system in a shortest focal length condition; $f_1$ represents a focal length of said first lens group $G_1$; $f_2$ represents a focal length of said second lens group $G_2$; $f_3$ represents a focal length of said third lens group $G_3$; $S_1$ represents a principal point spacing of said first lens group $G_1$ and said second lens group $G_2$; and $S_2$ represents a principal point spacing of said second lens group $G_2$ and said third lens group $G_3$.

7. A zoom lens system according to claim 1, wherein said first lens group $G_1$ remains stationary during zooming and comprises a positive laminated lens formed by a negative meniscus lens whose convex surface faces an eyepoint side and a positive equiconvex lens, wherein said third lens group $G_3$ comprises a laminated lens formed by a positive meniscus lens and a negative equiconcave lens, and wherein $V_1$ represents an Abbe's number of said negative meniscus lens in said first lens group $G_1$ and $V_3$ represents an Abbe's number of said negative equiconcave lens in said third lens group $G_3$ thereby satisfying the following conditions $$V_1 < 40, \text{ and}$$

$$V_3 > 40.$$

8. A zoom lens system having an eyepoint side and an object side comprising:

a first lens group $G_1$ having a positive refracting power;

a second lens group $G_2$ having a positive refracting power and movable along an optical axis;

a third lens group $G_3$ having a negative refracting power and movable along said optical axis; and an objective lens $L_O$ having a positive refracting power;

said first to third lens groups $G_1$ to $G_2$ and said objective lens $L_O$ being arranged in said order from said eyepoint side to said object side, said second lens group $G_2$ and said third lens group $G_3$ being responsive to a zooming operation to move in opposite directions to each other while interposing therebetween an object image formed by said objective lens $L_O$ between said second and third lens groups $G_2$ and $G_3$, said second lens group $G_2$ including a positive lens configuration, said positive lens configuration having a lens surface made of an aspheric surface, whereby the following condition is satisfied $$0 < (r_b + r_a)/(r_b - r_a) < 0.7$$

wherein $r_a$ and $r_b$ respectively represent radii of curvature at apex portions of an eyepoint-side lens surface and object-side lens surface of said positive lens means.

9. A zoom lens system according to claim 8, wherein said aspheric surface of said positive lens configuration has a shape in which a radius of curvature at a peripheral portion of said lens surface is larger than a radius of curvature at an apex portion of said lens surface.

10. A zoom lens system according to claim 8, wherein the eyepoint-side lens surface of said positive lens configuration is made of said aspheric surface.

11. A zoom lens system according to claim 8, wherein the object-side lens surface of said positive lens configuration is made of said aspheric surface.

12. A zoom lens system according to claim 8, wherein the shape of said aspheric surface is given by the following expression $$X = \frac{C_0 y^2}{1 + (1 - KC_0^2 y^2)^{1/2}} + \sum_{i=1}^{5} C_{2i} y^{2i}$$

where X represents an amount of deviation from an apex portion of said lens surface in an optical axis direction; y represents an amount of deviation from the apex portion of said lens surface in a direction perpendicular to said optical axis; $C_0$ represents a reciprocal (1/R) of a radius R of curvature at the apex portion of said lens surface; K represents a constant of the cone; and $C_{2i}$ (i is an order) represents an aspheric coefficient, and said $C_{2i}$ (=$C_4$) is selected to satisfy the following relation when i=2

$$1*10^{-6} < |C_4| < 1*10^{-2}.$$

13. A zoom lens system according to claim 8, wherein the following conditions are satisfied $$2.5 < f_1/f_M < 5.0,$$

$$2.0 < f_2/f_M < 4.0,$$

$$2.5 < |f_3|/f_M < 7.0,$$

$$0.1 < S_1/f_M < 1.0, \text{ and}$$

$$3.0 < S_2/f_M < 5.0$$

where $f_M$ represents a composite focal length of said zoom lens system in a shortest focal length condition; $f_1$ represents a focal length of said first lens group $G_1$; $f_2$ represents a focal length of said second lens group $G_2$; $f_3$ represents a focal length of said third lens group $G_3$; $S_1$ represents a principal point spacing of said first lens group $G_1$ and said second lens group $G_2$; and $S_2$ represents a principal point spacing of said second lens group $G_2$ and said third lens group $G_3$.

14. A zoom lens system according to claim 8, wherein said first lens group $G_1$ remains stationary during zooming and comprises a positive laminated lens formed by a negative meniscus lens whose convex surface faces an eyepoint side and a positive equiconvex lens, wherein said third lens group $G_3$ comprises a laminated lens formed by a positive meniscus lens and a negative equiconcave lens, and wherein $V_1$ represents an Abbe's number of said negative meniscus lens in said first lens group $G_1$ and $V_3$ represents an Abbe's number of said negative equiconcave lens in said third lens group $G_3$ thereby satisfying the following conditions $V_1 < 40$, and $V_3 > 40$.

* * * * *